P. P. ADOLPH.
WATER COOLER.
APPLICATION FILED NOV. 11, 1911.

1,082,841.

Patented Dec. 30, 1913.

WITNESSES
W. Klink
S. Birnbaum

INVENTOR
Paul P. Adolph
BY Sigmund Herzog
his ATTORNEY

UNITED STATES PATENT OFFICE.

PAUL P. ADOLPH, OF NEW YORK, N. Y.

WATER-COOLER.

1,082,841.  Specification of Letters Patent.  Patented Dec. 30, 1913.

Application filed November 11, 1911. Serial No. 659,862.

*To all whom it may concern:*

Be it known that I, PAUL P. ADOLPH, a subject of the German Emperor, and resident of the city of New York, in the county of New York and State of New York, have invented certain new and useful Improvements in Water-Coolers, of which the following is a specification.

The present invention relates to improvements in water coolers, which are provided as their more ordinary use in offices and households for supplying drinking water, which is furnished from time to time as the supply requires replenishment by dealers in such water. It is a common practice of such dealers to distribute the drinking water to their customers in portable holders, such as glass bottles, each containing a predetermined quantity. From the holders thus supplied the contents, or a portion thereof, are usually poured into the tank of the cooler, wherein the water is subjected to the cooling influence of ice provided in the cooler casing. The tank of the cooler is usually made of porcelain or earthenware of a substantial thickness, and it is well known that such bodies are comparatively poor heat conductors. As, however, the water from the tank is drawn off at irregular intervals, the tank, when made of such material, will prevent the refrigerant in the cooler casing from acting upon the inflowing water in time to furnish cool water in short time intervals.

It is now one of the objects of the present invention to obviate this defect of the coolers heretofore in use, and to provide a simple and effective device, whereby the refrigerant will be able to exercise its cooling influence upon the water in the tank almost instantaneously.

With these and other objects in view, which will more fully appear as the nature of the invention is better understood, the same consists in the combination, arrangement and construction of parts hereinafter fully described, pointed out in the appended claim and illustrated in the accompanying drawings, it being understood that many changes may be made in the size and proportion of the several parts and minor details of construction without departing from the spirit or sacrificing any of the advantages of the invention.

One of the many possible embodiments of the invention is illustrated in the accompanying drawings, in which:—

Figure 1:
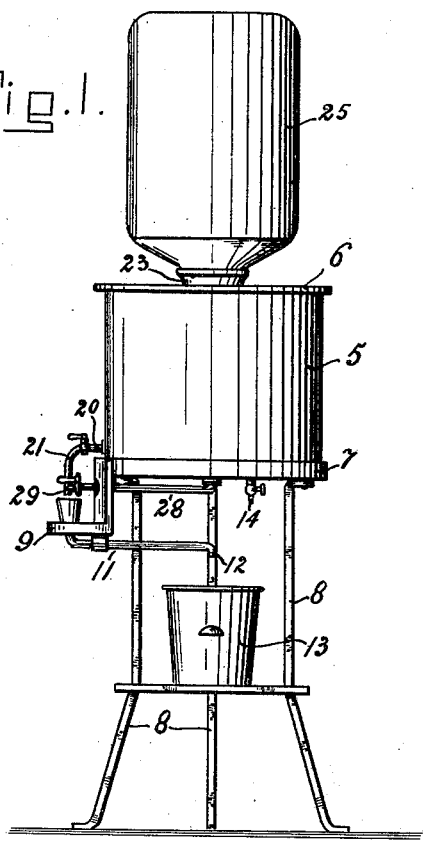
Figure 3:
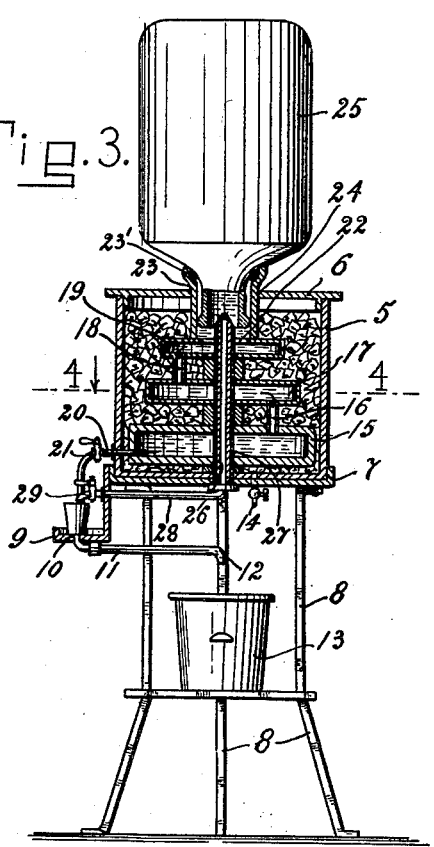
Figure 2:
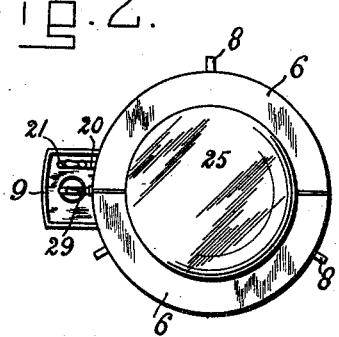
Figure 4:
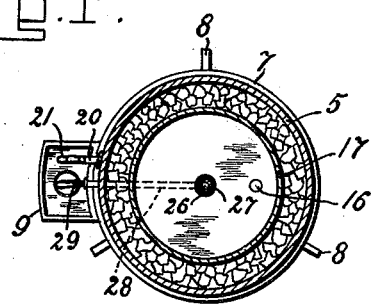

Figure 1 is a side elevation of an apparatus constructed in accordance with the present invention; Fig. 2 is a plan view thereof; Fig. 3 is a central vertical section, partly in elevation, of the apparatus; and Fig. 4 is a section taken on line 4—4 of Fig. 3.

In the drawings, the numeral 5 indicates a cooler casing of any suitable shape and size, made of heat non-conducting material. This casing is provided with a removable cover 6, and is mounted upon a bed plate 7, which is supported by legs or standards 8, 8. To the bed plate 7 is attached a drinking glass support 9, provided in its bottom with an aperture 10, communicating with a pipe 11, which extends toward the vertical axis of the apparatus and terminates in a downwardly extending spout 12, below which is arranged the waste water receptacle 13. The cooler casing is provided in its bottom with a drain cock 14, for a well known purpose.

The water tank of the cooler is made of a plurality of sections, the lowermost section of which is denoted by the numeral 15, and consists of a closed earthen or porcelain receptacle, or made of any other material, the heat conducting properties of which are poor. This receptacle communicates through a pipe 16 with the second section of the water tank, which is denoted by the numeral 17, and, in turn, connected by a pipe 18 with the third section, indicated by the numeral 19. The sections 17 and 19 of the tank are made of non-corrodible metal, and are good heat conductors. The ice or other refrigerant is placed in the space between the walls of the casing 5 and the sections of the water tank. From the lowermost and largest section 15 of the tank leads a pipe 20 through the cooler casing, and is provided outside of said casing with a draw-off faucet or cock 21. The uppermost section, that is the section 19 of the tank, is provided with a centrally arranged aperture 22, and through the latter communicates with the water tank a tubular member 23, which projects through an opening 24 in the cover 6 of the cooler casing, and supports with its neck projecting into the same the water bottle or other portable storage vessel 25, whereby the water will flow into said tubular member and through the aperture 22 in the section 19 of the water tank into the latter, so that when ice is contained in the cooler casing, it will exert its cooling effect through the walls of the sections 17 and 19 of the tank upon the contents of the latter. On the upper end of the tubular member 23 is arranged a gasket 23′, of rubber or other elastic material, for forming a seat for the bottle 25. A tube 26 leads through the bottom of the cooler casing and through the water tank, and projects above the open end of the tubular member 23 into the bottle 25. This tube is covered throughout its length with heat non-conducting material 27, and is joined outside of the casing 5 with a pipe 28, upon the end of which is mounted a faucet or cock 29.

The operation of the device is as follows: The water bottle is placed upon the supporting tubular member 23, whereby water will flow through the aperture 22 in the section 19 of the water tank into the latter. Water will also flow into the tube 26. The water contained in the sections 17 and 19 of the tank will be cooled in a short time since the sections are made of a good heat conducting material. As the water is drawn off through the faucet 21, a corresponding supply will enter the water tank and be cooled in the manner above specified, while the cooled water contained in the upper two sections will pass through the tube 16 into the section 15 of the tank and effectively kept cool therein for the reason that the section is made of material, the heat conducting capacity of which is poor. It should be observed that, if uncooled water is desired, the glass is placed under the faucet 29 and water drawn off through the latter; this water, coming directly from the bottle, is uncooled, since the heat non-conducting material 27 prevents the ice from exerting its cooling effect upon the water contained in the tube 26. It will be observed that any suitable mixture of cooled and uncooled water may be obtained by drawing from both faucets into the same glass.

Attention is called to the fact that the tube 26 with its coating of insulating material does not form part of this invention, as the same has been described and claimed in Letters Patent No. 1,005,588, granted to me Oct. 10, 1911.

What I claim is:—

In a water cooler, the combination with a cooler casing for containing ice or other refrigerating material, of a plurality of receptacles therein communicating with each other, the lowermost of said receptacles being made of a material, the heat conducting capacity of which is poor and serving as a storage vessel, the other receptacles being made of good heat conducting material, a tubular member arranged upon the uppermost of said receptacles and communicating with the latter through an aperture in said receptacle, said tubular member serving as a support for a supply container, and a cock controlled pipe leading from the exterior of said casing to the lowermost of said receptacles.

Signed at New York, in the county of New York, and State of New York, this 1st day of November, A. D. 1911.

PAUL P. ADOLPH.

Witnesses:
SIGMUND HERZOG,
S. BIRNBAUM.

Copies of this patent may be obtained for five cents each, by addressing the "Commissioner of Patents, Washington, D. C."